(12) United States Patent
Peng et al.

(10) Patent No.: US 6,592,666 B1
(45) Date of Patent: Jul. 15, 2003

(54) METHOD AND APPARATUS FOR APPLYING A SIZING COMPOSITION TO GLASS FIBERS

(75) Inventors: Hong Peng, Pickerington, OH (US); Christopher M. Hawkins, Alexandria, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/474,440

(22) Filed: Dec. 29, 1999

(51) Int. Cl.[7] ................................................. B05C 1/00
(52) U.S. Cl. ........................ 118/234; 118/603; 65/532
(58) Field of Search ................... 65/529, 532; 118/603, 118/693, 259, 694, 420, 234, 258, 602, 610

(56) References Cited

U.S. PATENT DOCUMENTS

| | | |
|---|---|---|
| 2,272,588 A | 2/1942 | Simison |
| 2,373,078 A | 4/1945 | Kleist |
| 2,781,021 A | 2/1957 | Schmitz |
| 2,861,393 A | 11/1958 | Whitehurst et al. |
| 2,968,278 A | 1/1961 | Wolfe |
| 3,485,210 A | 12/1969 | Warren |
| 3,498,262 A | 3/1970 | Hill et al. |
| 3,819,344 A | 6/1974 | Thumm et al. |
| 3,821,543 A | 6/1974 | Gelin et al. |
| 3,827,397 A | 8/1974 | Hebberling et al. |
| 3,865,565 A | 2/1975 | Spence et al. |
| 3,869,268 A | 3/1975 | Briar et al. |
| 3,878,813 A | 4/1975 | Roberson et al. |
| 3,961,601 A | 6/1976 | Hunter |
| 3,983,837 A * | 10/1976 | Francis ........................ 118/603 |
| 3,997,308 A | 12/1976 | Drummond et al. |
| 4,013,435 A | 3/1977 | Kane et al. |
| 4,015,559 A | 4/1977 | Sears et al. |
| 4,042,360 A | 8/1977 | Kane et al. |
| 4,071,341 A | 1/1978 | Bohy et al. |
| 4,088,468 A | 5/1978 | Roberson |
| 4,109,610 A | 8/1978 | Parbhoo et al. |
| 4,115,088 A | 9/1978 | Walker |
| 4,168,959 A | 9/1979 | Loeffler |
| 4,170,459 A | 10/1979 | Myers |
| 4,191,663 A | 3/1980 | Kuehl |
| 4,192,252 A | 3/1980 | Paul |
| 4,222,344 A | 9/1980 | Parbhoo |
| 4,517,916 A | 5/1985 | Barch et al. |
| 4,537,610 A | 8/1985 | Armstrong et al. |
| 4,540,610 A * | 9/1985 | Conklin et al. ............. 118/420 |
| 4,579,078 A | 4/1986 | French et al. |
| 5,011,523 A | 4/1991 | Roncato et al. |
| 5,055,119 A | 10/1991 | Flautt et al. |
| 5,084,305 A | 1/1992 | Marttila |
| 5,316,561 A | 5/1994 | Roncato et al. |
| 5,443,611 A | 8/1995 | Salvador et al. |
| 5,577,110 A | 11/1996 | Aquino |
| 5,639,292 A | 6/1997 | Hawkins |
| 5,671,826 A | 9/1997 | Zenoni |
| 5,674,110 A | 10/1997 | Cuoghi |
| 5,954,853 A | 9/1999 | Peng et al. |
| 5,961,685 A | 10/1999 | Streets et al. |

FOREIGN PATENT DOCUMENTS

GB     1002570     8/1965

* cited by examiner

*Primary Examiner*—Brenda A. Lamb
(74) *Attorney, Agent, or Firm*—Inger H. Eckert; Stephen W. Barns; Maria C. Gasaway

(57) ABSTRACT

A process and apparatus are provided for applying a sizing composition to glass fibers with improved size application efficiency, while also providing for the collection and reuse of sizing composition, as well as for providing sizing composition to the applicator device, The apparatus includes a rotatable, but otherwise stationary, sizing applicator device which can be replaced without substantial interruption of the sizing application process while also providing a sizing reservoir for the collection and reuse of sizing composition, as well as for providing sizing composition to the applicator device.

16 Claims, 2 Drawing Sheets

METHOD AND APPARATUS FOR APPLYING A SIZING COMPOSITION TO GLASS FIBERS

TECHNICAL FIELD AND INDUSTRIAL APPLICABILITY OF THE INVENTION

The present invention relates to a method and apparatus for applying a sizing composition to glass fibers.

BACKGROUND OF THE INVENTION

Glass fibers are useful in a variety of technologies. A common application of glass fibers is as reinforcements in polymer matrices to form glass fiber reinforced plastics or composites. The manufacturing of glass fibers begins by providing molten glass to a heat-resistant platinum tray called a "bushing." The bushing has a plurality of orifices through which the molten glass flows to become filaments. The filaments are then coated with a size, aqueous or nonaqueous, via an applicator roll. The sizing on the filaments protects the filaments during processing and handling and also serves as a polymer reinforcement by ensuring the adhesion of the glass filaments to the resin material. Finally, after the sizing is applied, the filaments are gathered together into strands at what is known as a gathering shoe and wound on a collet to produce a glass fiber package.

U.S. Pat. No. 4,537,610 discloses an applicator for applying a nonaqueous sizing composition to glass fibers. The applicator includes a driven roll which receives sizing from a chamber and applies the sizing to the surface of glass fibers which are drawn across it. One problem common to applicators having driven rolls is "fiber wrap." This problem occurs when the fibers adhere to the surface of the size-coated driven roll such that the fibers become wrapped about the roll. Such a problem is costly as it results in a shutdown of the fiber forming process.

Accordingly, there is a need for an improved apparatus for applying a nonaqueous sizing composition to glass fibers.

SUMMARY OF THE INVENTION

This need is met by the present invention whereby an improved apparatus is provided for applying a nonaqueous sizing composition to glass fibers.

In accordance with a first aspect of the present invention, a sizing applicator is provided for applying a coating of sizing composition to reinforcement fibers. The sizing applicator comprises an applicator element including a main body portion having at least one recess for receiving a replaceable insert and sizing supply apparatus positioned adjacent to the applicator element for supplying a sizing composition to the applicator element. The applicator element is adapted to be positioned such that the insert is engaged by reinforcement fibers drawn across the applicator element. The applicator element applies a coating of the sizing composition to the reinforcement fibers drawn across the applicator element.

The main body portion may include two or more recesses and the applicator element may include two or more inserts.

The main body portion is rotatable to permit a worn insert to be rotated away from the path of the reinforcement fibers and to allow an unused insert to be positioned in that path. Rotation of the main body portion may occur during a fiber forming process.

An indexing mechanism, either motor driven or manually operated, may be provided for effecting rotation of the main body portion.

Preferably, the inserts are formed from a wear-resistant material, such as graphite, graphite coated stainless steel, or a phenolic resin and graphite composite including a lubricant additive such as teflon.

The sizing supply apparatus may comprise a sizing supply source and a housing having a supply port for receiving sizing composition from the sizing supply source and a passage extending from the supply port to an exit slot. The passage comprises a cavity which communicates with the supply port and a passageway extending from the cavity and terminating at the exit slot. The passage receives the sizing composition from the supply port and delivers the sizing composition to the exit slot. The applicator element is supported by the housing and positioned to receive the sizing composition discharged at the exit slot.

The sizing supply source comprises a reservoir for storing sizing composition to be applied to the reinforcement fibers, and pumping apparatus coupled to the reservoir and the housing supply port for transferring the sizing composition from the reservoir to the housing supply port. The pumping apparatus comprises first and second conduits and a metering pump. The first conduit is coupled to the reservoir and the metering pump and the second conduit is coupled to the metering pump and the supply port. The reservoir is preferably positioned relative to the applicator element so as to capture excess sizing composition falling from the applicator element. The sizing supply source may further include a screen provided in the reservoir for filtering contaminants from the captured sizing composition to permit the captured sizing composition to be reused.

The sizing supply source preferably further comprises a level sensor for sensing when the sizing composition in the reservoir has fallen below a predetermined level. Fill apparatus may be provided for supplying additional sizing composition to the reservoir when the level sensor indicates that the sizing composition in the reservoir is below the predetermined level. The fill apparatus comprises a fill pump, a size supply tank, a first conduit extending from the tank and coupled to the fill pump and a second conduit coupled to the fill pump and extending to the reservoir.

In accordance with a second aspect of the present invention, a sizing applicator is provided for applying a coating of sizing composition to reinforcement fibers. The sizing applicator comprises an applicator element and sizing supply apparatus positioned adjacent to the applicator element for supplying a sizing composition to the applicator element. The applicator element applies a coating of the sizing composition to reinforcement fibers drawn across the applicator element. The sizing supply apparatus includes a sizing supply source and a housing for receiving sizing composition from the sizing supply source. The sizing supply source comprises a reservoir for storing the sizing composition to be applied to the reinforcement fibers and is positioned relative to the applicator element so as to capture excess sizing composition falling from the applicator element. The sizing supply source further includes a screen in the reservoir for filtering contaminants from the captured sizing composition to permit the captured sizing composition to be reused.

The above-discussed and other aspects, objects, features, and advantages of the invention will be apparent from the detailed description below and the appended drawing figures.

DETAILED DESCRIPTION AND PREFERRED EMBODIMENTS OF THE INVENTION

Figure 1:
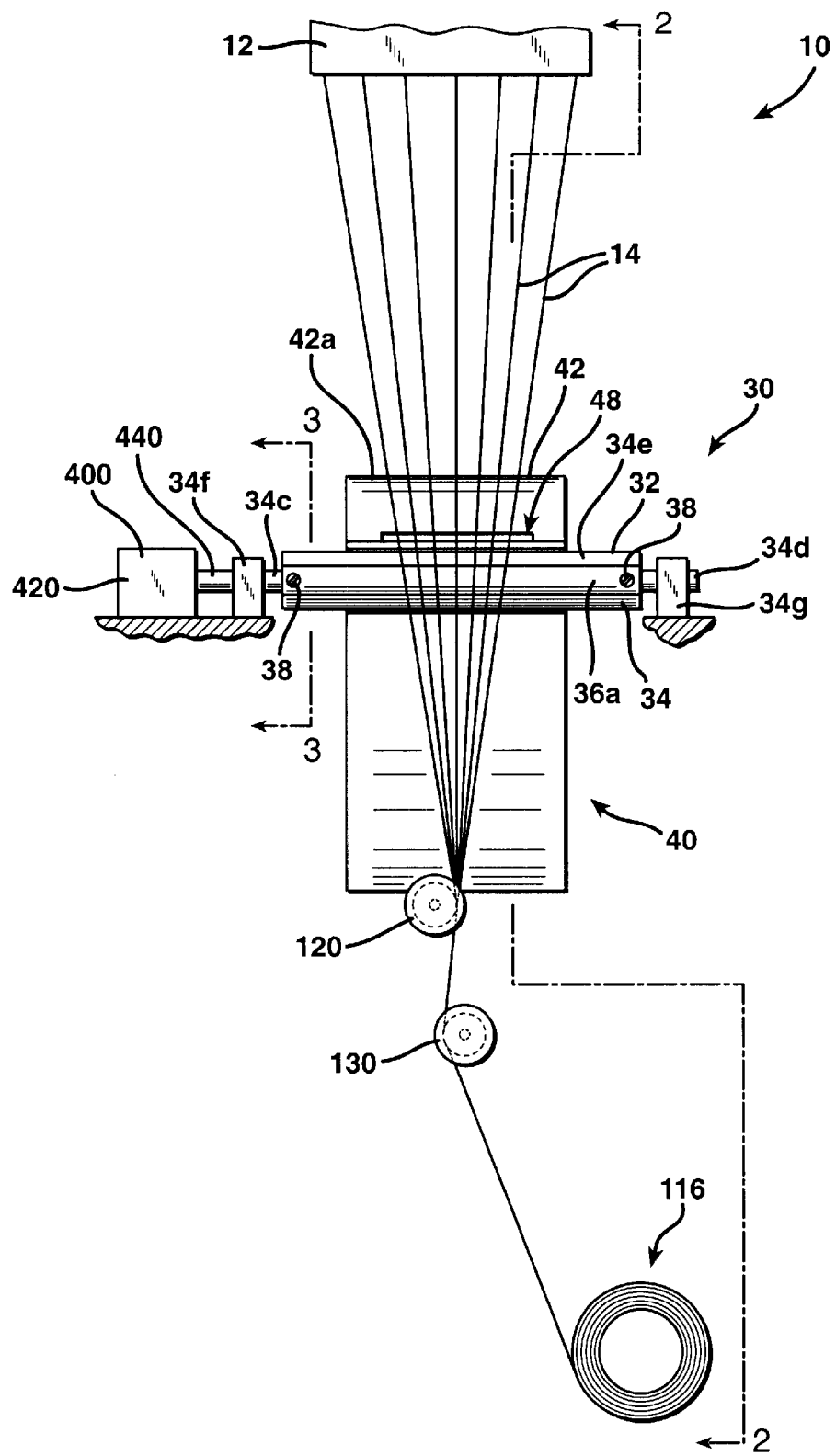
FIG. 1 is a front view of an apparatus constructed in accordance with the present invention.
Figure 2:
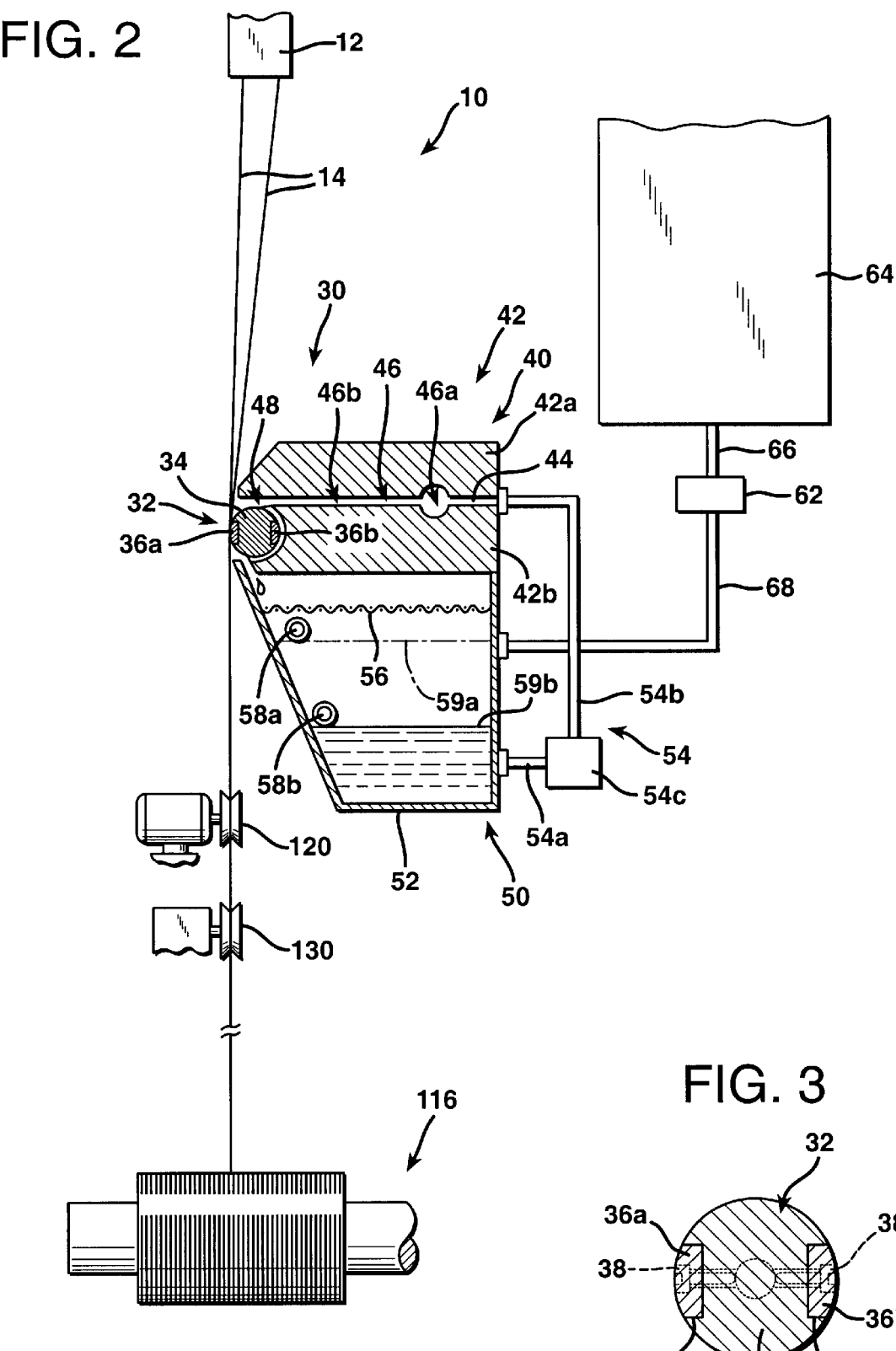
FIG. 2 is a view taken along view line 2—2 in FIG. 1.

A preferred embodiment for an apparatus for coating a sizing composition onto glass fibers drawn from a source of molten glass in accordance with the present invention is shown in FIGS. 1 and 2, and is generally designated by the reference numeral 30. The glass forming process shown in FIG. 1 and generally designated by the reference numeral 10 comprises a bushing 12 having a number of orifices (not shown) through which a plurality of streams of molten glass are discharged. The orifices may be extended by hollow studs or tips (not shown). The streams of glass are mechanically drawn to form continuous fibers 14 via a winder device 116. A conventional chopper (not shown) may be used in place of the winder device 116. The fibers 14 pass across a sizing applicator 30 which applies a uniform coating of sizing composition to the fibers 14. The sizing composition applied by the applicator 30 is typically nonaqueous based, but may be of any other suitable type.

Figure 3:
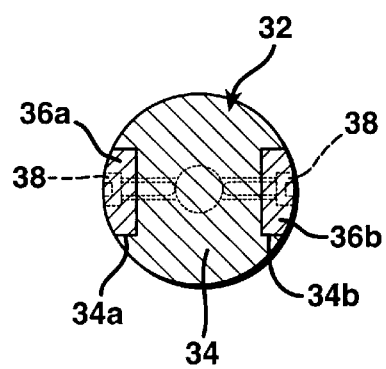
FIG. 3 is a cross sectional view taken along line 3—3 of FIG. 1.

The sizing applicator 30 comprises an applicator element 32 and sizing supply apparatus 40 positioned adjacent to the applicator element 32 for supplying the sizing composition to the applicator element 32. The applicator element 32 includes a generally cylindrical main body portion 34 having, in the illustrated embodiment, first and second recesses 34a and 34b for receiving respectively first and second replaceable inserts 36a and 36b, see FIGS. 1 and 3. Alternatively, one or three or more recesses and a like number of inserts may be provided. Preferably, the inserts 36a and 36b are formed from a wear-resistant material, such as graphite, graphite coated stainless steel, or a phenolic resin and graphite composite including a lubricant such as TEFLON. In the illustrated embodiment, the inserts 36a and 36b are manually inserted into the recesses 34a and 34b and held in place via bolts 38.

The main body portion 34 further includes first and second shafts 34c and 34d extending out from a center section 34e of the main body portion 34, see FIG. 1. The shafts 34c and 34d are received in corresponding bearings 34f and 34g which allow the main body portion 34 to be rotated. In the illustrated embodiment, the center section 34e has a diameter of about 0.75 inch and each recess 34a and 34b has a depth (extending toward a center axis of the center section 34e) of about 0.125 inch and a width (extending transversely to the depth dimension) of about 0.375 inch.

An indexing mechanism 400 comprising a motor 420 and a drive shaft 440 coupled to or integral with the first shaft 34c is provided for effecting rotation of the main body portion 34. The motor 420 is activated via a switch (not shown) provided on the motor 420. Alternatively, the indexing mechanism may include a manually operable crank mechanism instead of a motor to effect rotation of the main body portion 34.

The applicator element 32 is rotatably positioned such that one of the inserts 36a and 36b is engaged by the reinforcement fibers 14 being drawn downwardly by the winder device 116. In FIGS. 1 and 2, the first insert 36a is shown positioned in the path of the moving fibers 14. When the insert 36a becomes worn, the indexing mechanism 400 is activated via the switch for a time period sufficient to allow the main body portion 34 to rotate approximately 180° such that the second insert 36b is positioned in the path of the moving fibers 14. Rotation of the main body portion 34 may occur during a fiber forming operation. Hence, when one of the inserts 36a and 36b becomes worn, the fiber forming operation is not stopped to permit replacement of the worn insert. Rather, the main body portion 34 is rotated during the fiber forming operation such that a new insert is positioned in the path of the moving fibers 14. Thereafter, the worn insert, which is positioned opposite to the insert being contacted by the moving fibers 14, is replaced with a new insert.

The sizing supply apparatus 40 comprises a sizing supply source 50 and a heated housing 42. The housing 42 comprises upper and lower sections 42a and 42b which, when joined to one another, define a supply port 44 for receiving sizing composition from the sizing supply source 50 and a passage 46 extending from the supply port 44 to an exit slot 48. The passage 46 comprises a cavity 46a which communicates with the supply port 44 and a passageway 46b extending from the cavity 46a and terminating at the exit slot 48. The passage 46 receives the sizing composition from the supply port 44 and delivers the sizing composition to the exit slot 48. The housing 42 is constructed in essentially the same manner as the sizing applicator housing disclosed in U.S. Pat. No. 5,954,853, the disclosure of which is incorporated herein by reference, except for the location of the supply port 44.

The sizing supply source 50 comprises a heated reservoir 52 for storing sizing composition to be applied to the reinforcement fibers 14, and pumping apparatus 54 coupled to the reservoir 52 and the housing supply port 44 for transferring sizing composition from the reservoir 52 to the housing supply port 44. The pumping apparatus 54 comprises first and second heated conduits 54a and 54b and a metering pump 54c, such as the pump disclosed in U.S. Pat. No. 5,954,853 which is hereby incorporated by reference. The heated conduits 54a and 54b may be structurally equivalent to the heated hose disclosed in the '853 patent. The first conduit 54a is coupled to the reservoir 52 and the metering pump 54c and the second conduit 54b is coupled to the metering pump 54c and the supply port 44. The pump 54c is typically operated continuously during a fiber forming operation.

The reservoir 52 is configured and positioned relative to the applicator element 32 so as to capture excess sizing composition falling from the applicator element 32. A screen 56 is provided in the reservoir 52 for filtering contaminants from the captured sizing composition to permit the captured sizing composition to be reused.

The sizing supply source 50 further includes first and second level sensors 58a and 58b, see FIG. 2. The two level sensors 58a and 58b may comprise any one of a number of commercially available sensors for detecting a fluid such as a fluid level switch sensor, one of which is commercially available from Barksdale under the product designation "BLS-7 (L007011)". Sensor 58a detects when the level of sizing composition in the reservoir 52 reaches a first predetermined level, indicated by dashed line 59a in FIG. 2, and sensor 58b detects when the level of the sizing composition in the reservoir 52 falls below a second predetermined level, indicated by dotted line 59b.

Fill apparatus 60, shown only in FIG. 2, is provided for supplying additional sizing composition to the reservoir 52 when the second sensor 58b indicates that the sizing composition in the reservoir 52 is below the second predetermined level 59b. The fill apparatus comprises a fill pump 62, a size supply tank 64, a first conduit 66 extending from the tank 64 and coupled to the fill pump 62 and a second conduit 68 coupled to the fill pump 62 and extending to the reservoir 52. When the level of the sizing composition in the reservoir 52 falls below the second predetermined level 59b, sensor 58b generates a refill signal to a conventional controller (not shown) which effects operation of the pump 62 until the level of the sizing composition within the reservoir 52 is equal to or above the first predetermined level 59a. When that condition is sensed by the first sensor 58a, a stop signal is generated by the sensor 58a to the controller causing the pump 62 to cease its operation.

The apparatus 10 further includes first and second shoes 120 and 130 which may be structurally equivalent to the first and second shoes 50 and 60 set out in U.S. Pat. No. 5,954,853, which has previously been incorporated herein by reference.

Having described the invention in detail and by reference to a preferred embodiment thereof, it will be apparent that modifications and variations are possible without departing from the scope of the invention defined in the appended claims.

What is claimed is:

1. A sizing applicator for applying a coating of sizing composition to reinforcement fibers comprising:
   an applicator element comprising a main body portion having two or more recesses for receiving a replaceable insert, said applicator element being adapted to be positioned such that two or more inserts are engaged by reinforcement fibers drawn across said applicator element; and
   sizing supply apparatus positioned adjacent to said applicator element for supplying a sizing composition to said applicator element, said applicator element applying a coating of said sizing composition to the reinforcement fibers drawn across said applicator element.

2. A sizing applicator as set forth in claim 1, wherein said main body portion is rotatable to permit a worn insert to be moved out of the path of the reinforcement fibers and to allow an unused insert to be positioned in that path.

3. A sizing applicator as set forth in claim 2, further comprising an indexing mechanism for effecting rotation of said rain body portion.

4. Sizing applicator as set forth in claim 2, wherein said inserts are formed from a wear-resistant material.

5. A sizing applicator as set forth in claim 4, wherein said wear-resistance material comprises one of graphite, graphite coated stainless steel, and a phenolic resin and graphite composite.

6. A sizing applicator for applying a coating of sizing composition to reinforcement fibers comprising:
   an applicator element comprising a main body portion having at least one recess for receiving a replaceable insert, said applicator element being adapted to be positioned such that said insert is engaged by reinforcement fibers drawn across said applicator element; and
   a sizing supply apparatus positioned adjacent to said applicator element for supplying a sizing composition to said applicator element, said applicator element applying a coating of said sizing composition to the reinforcement fibers drawn across said applicator element, wherein said sizing supply apparatus comprises a housing having a housing supply port for receiving sizing composition from a sizing supply source wherein said sizing supply source comprises a reservoir for storing sizing composition to be applied to the reinforcement fibers, and a pumping apparatus coupled to said reservoir and said housing supply port for transferring said sizing composition from said reservoir to said housing supply port, wherein said reservoir is positioned relative to said applicator element so as to capture excess sizing composition falling from said applicator element, and said sizing supply source further including a screen provided in said reservoir for filtering contaminants from said captured sizing composition to permit said captured sizing composition to be reused, wherein said housing further comprises a passage extending from said housing supply port to an exit slot, said passage receiving said sizing composition from said housing supply port and delivering said sizing composition to said exit slot, said applicator element being supported by said housing and positioned to receive said sizing composition discharged at said exit slot.

7. A sizing applicator as set forth in claim 6, wherein said passage comprises a cavity which communicates with said supply port and a passageway extending from said cavity and terminating at said exit slot.

8. A sizing applicator as set forth in claim 6, wherein said pumping apparatus comprises first and second conduits and a metering pump, said first conduit being coupled to said reservoir and said metering pump and said second conduit being coupled to said metering pump and said supply port.

9. A sizing applicator as set forth in claim 6, wherein said sizing supply source further comprises a level sensor for sensing when said sizing composition in said reservoir has fallen below a predetermined level.

10. A sizing applicator as set forth in claim 9, further comprising fill apparatus for providing additional sizing composition to said reservoir when said level sensor indicates that said sizing composition in said reservoir is below said predetermined level.

11. A sizing applicator as set forth in claim 10, wherein said fill apparatus comprises a fill pump, a size supply tank, a first conduit extending from said tank and coupled to said fill pump and a second conduit coupled to said fill pump and extending to said reservoir.

12. A sizing applicator for applying a coating of sizing; composition to reinforcement fibers comprising:
   an applicator element;
   sizing supply apparatus positioned adjacent to said applicator element for supplying a sizing composition to said applicator element, said applicator element applying a coating of said sizing composition to reinforcement fibers drawn across said applicator element; and
   said sizing supply apparatus including a sizing supply source and a housing for receiving sizing composition from said sizing supply source, said sizing supply source comprising a reservoir for storing said sizing composition to be applied to the reinforcement fibers and positioned relative to said applicator element so as to capture excess sizing composition falling from said applicator element and a screen in said reservoir for filtering contaminants from said captured sizing composition to permit said captured sizing composition to be reused,
   wherein said housing has a supply port for receiving sizing composition from said sizing supply source and a passage extending from said supply port to an exit slot, said passage receiving said sizing composition from said supply port and delivering said sizing composition to said exit slot, said applicator element being supported by said housing and positioned to receive said sizing composition discharged at said exit slot.

13. A sizing applicator as set forth in claim 12, wherein said sizing supply source further comprises pumping apparatus coupled to said reservoir and said housing supply port for transferring sizing composition from said reservoir to said housing supply port.

14. A sizing applicator as set forth in claim 13, wherein said pumping apparatus comprises first and second conduits and a metering pump, said first conduit being coupled to said reservoir and said metering pump and said second conduit being coupled to said metering pump and said supply port.

15. A sizing applicator as set forth in claim 12, wherein said sizing supply source further comprises a level sensor for sensing when said sizing composition in said reservoir has fallen below a predetermined level.

16. A sizing applicator as set forth in claim 15, further comprising fill apparatus for providing additional sizing composition to said reservoir when said level sensor indicates that said sizing composition is below said predetermined level.

* * * * *